United States Patent [19]

Fisher

[11] Patent Number: 5,708,704
[45] Date of Patent: Jan. 13, 1998

[54] SPEECH RECOGNITION METHOD AND SYSTEM WITH IMPROVED VOICE-ACTIVATED PROMPT INTERRUPT CAPABILITY

[75] Inventor: Thomas Drew Fisher, Dallas, Tex.

[73] Assignee: Texas Instruments Incorporated, Dallas, Tex.

[21] Appl. No.: 418,327

[22] Filed: Apr. 7, 1995

[51] Int. Cl.$^6$ .................................................. H04M 9/08
[52] U.S. Cl. ........................... 379/410; 379/67; 395/2.37
[58] Field of Search ........................... 379/406, 410, 379/411, 67, 88, 89; 395/2.35, 2.37

[56] References Cited

U.S. PATENT DOCUMENTS

| | | | |
|---|---|---|---|
| 4,914,692 | 4/1990 | Hartwell et al. | 379/410 |
| 5,155,760 | 10/1992 | Johnson et al. | 379/67 |
| 5,400,394 | 3/1995 | Raman et al. | 379/410 |
| 5,425,098 | 6/1995 | Kamiya | 379/410 |

OTHER PUBLICATIONS

Messerschmitt, D., Hedberg, D., Cole, C., Haoui, A., and Winship, P., "Digital Voice Echo Canceller with a TMS32020", *Digital Signal Processing Applications With The TMS320 Family*, pp. 417–436, Texas Instruments, Inc., 1986.

Picone, Johnson, and Hartwell, *Enhancing the Performance of Speech Recognition With Echo Cancellation*, ICASSP 88 vol. 1 Speech Processing 1988, pp. 529–532.

Primary Examiner—Fan Tsang
Attorney, Agent, or Firm—Robert L. Troike; W. James Brady, III; Richard L. Donaldson

[57] ABSTRACT

The present invention provides a system for a voice prompt talkover capability. The system and method include a speech recognizer (36), an echo canceler (24), a delay finder (27) and a utterance extraction mechanism (30). The delay finder (27) determines the propagation delay between outgoing signal and the incoming signal and stores the signal in a delay buffer (23) in accordance with the delay and the filter length of the echo canceler. The echo canceler (24), using the incoming signals, the delay buffer and the delay enhance the incoming signal by removing the echo. The utterance extractor (30) determines the start of an utterance based on energy in the vectors of the LPC buffer (28). Upon the detection of an utterance the utterance extractor (30) initiates the start of recognition and terminates operation of the echo canceler (24) and the prompt play out (14). A recognition result is returned from the speech recognition processor (36) to the application (12).

6 Claims, 5 Drawing Sheets

SPEECH RECOGNITION METHOD AND SYSTEM WITH IMPROVED VOICE-ACTIVATED PROMPT INTERRUPT CAPABILITY

NOTICE

Copyright© 1994 Texas Instruments Incorporated

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD OF THE INVENTION

The present invention relates to a speech recognition method and system with voice-activated interrupt capability.

BACKGROUND

Several applications exist which require the processing of a user's voiced responses to prompt messages generated by the application. These applications are usually implemented over a telephone communications network. The applications include banking services, airplane scheduling, registering for classes at the local university and catalog shopping.

Due to the nature of telephone communications, however, an incoming signal includes not only the user's voiced response to the prompt message but also noise which should be removed or at least attenuated before the incoming signal is further processed. One source of noise is distortion introduced by the communications channel. Another source of the noise included in the incoming signal is one or more reflections or delayed "echoes" of the prompt message.

An efficient, effective voice recognition system or voice recognition task requires the removal or at least the attenuation of as much of this noise as possible from the incoming signal. One method of removing or at least attenuating the effects of echoes is with an echo canceler.

Echo cancelers, however, are expensive not only in terns of cost but also in terms of processing time and memory space. To build an application specific device which includes both an echo canceler and a speech recognition processor, i.e. using a single general purpose digital signal processor, is difficult, at best. In general, as more filter taps are included in the equaling filter included in within the echo canceler, echo cancellation becomes more effective, but the echo canceler also becomes more expensive in that more filter taps also means that more processing time and memory space may be needed to calculate and store the necessary parameter data to implement the echo canceler.

Furthermore, in a voice-recognition system or voice recognition task that will become part of any number of network implementations, each with their own characteristic channel distortions and channel delays, an effective echo canceler for one network implementation may be completely ineffective for another network implementation in that it may take too long for the echo canceler to adapt to the channel.

In most systems, the "width" of the echo canceler (how much time it covers) is sufficient to cover the impulse response of the incoming echo however, it is often insufficient to cover any delay between the echo and the actual prompt. This delay can be as long as 400 samples (50 milliseconds), thus requiring a 400 tap echo canceler. Due to conflicts with other processing, i.e., voice-recognition processing, certain implementations cannot support more than a 128 tap echo canceler in real-time.

This problem is particular acute in a networked voice-recognition system or voice recognition task which allows the user to start to speak before the prompt message included in the outgoing signal is finished. Providing for prompt interrupt or "barge in" in a networked environment where the delay turns out to be too long for the echo canceler to handle may mean that the initial syllables of the incoming speech are lost due to the time lag between receipt of the incoming signal and detection of incoming speech within the incoming signal. Furthermore, in a long delay in the channel prevents the echo canceler from converging in a timely manner, then even if the initial syllables of the incoming speech are not lost, they may be unrecognizable by the voice recognition system.

Thus, for at least the foregoing reasons, there is a need for an efficient voice recognition system and method which includes a voice-activated prompt interrupt capability.

SUMMARY OF THE INVENTION

The present invention is directed to a system and method for providing prompt interrupt capability in a voice activated telephone based system.

In a first embodiment of the present invention incoming signals are received from a communications channel during the transmission of outgoing signals through the communications channel. The outgoing signals, which include an outgoing prompt message, and the incoming signals, which include the spoken voice command in addition to possible returning prompt echo. An echo canceler then cancels the echo of the outgoing prompt message from a portion of the incoming signals determined in accordance with the channel delay and a filter length associated with the echo canceler. The present invention includes a delay finder for determined delay through the communications channel.

BRIEF DESCRIPTION OF THE DRAWINGS

These and other features, aspects, and advantages of the present invention will become better understood with regard to the following description, appended claims and accompanying drawings where:

DETAILED DESCRIPTION OF THE INVENTION

Figure 1:
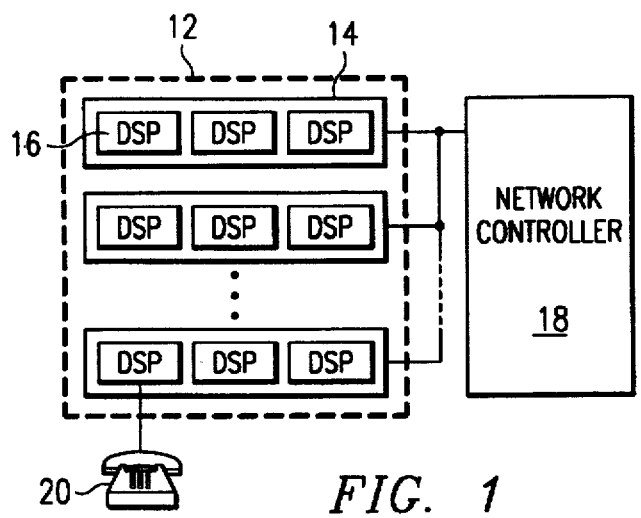
FIG. 1 is a block diagram of an exemplary communications network.

FIG. 1 shows a block diagram illustrating an exemplary telephone network which uses the present invention. FIG. 1 shows a processor 12 which includes a plurality of digital signal processors (DSPs) 16 each of which processes incoming and outgoing calls for a telephone 20 in accordance with the present invention through network controller 18.

Figure 2:
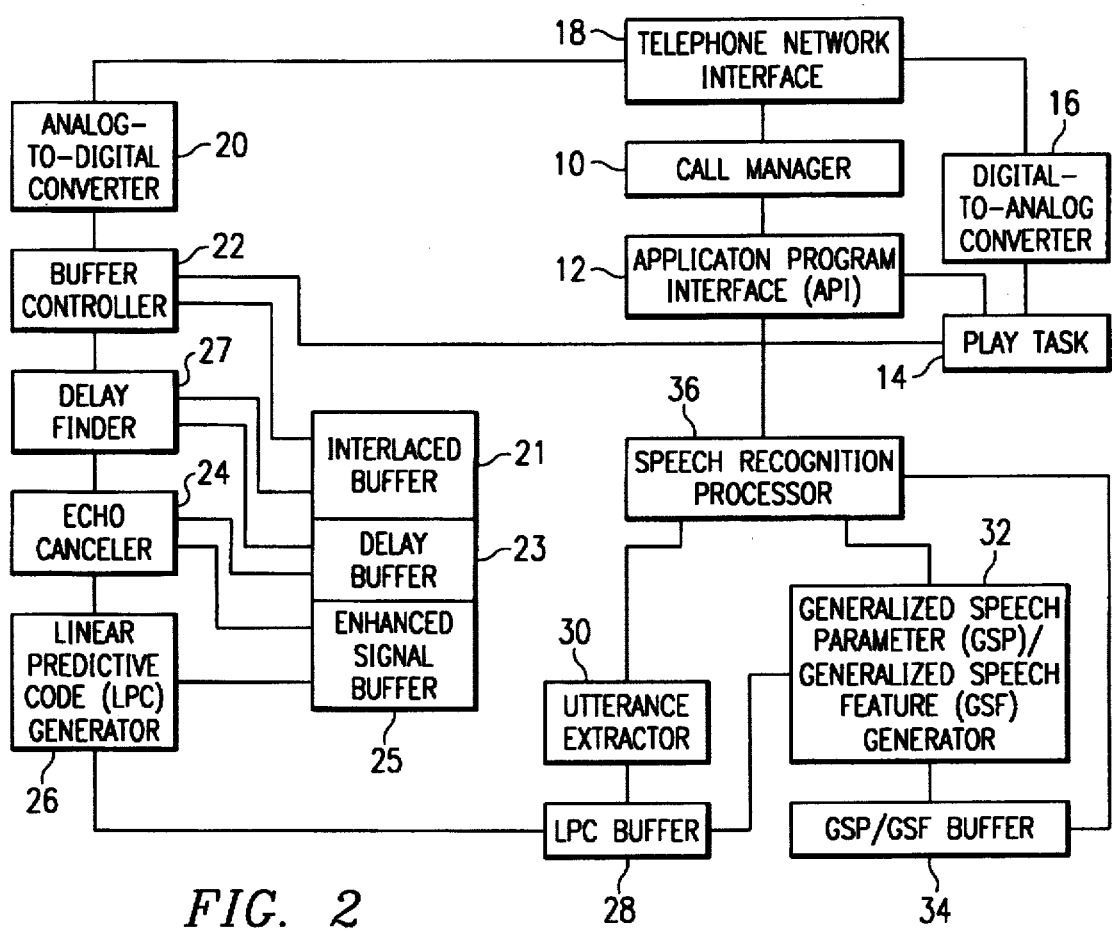
FIG. 2 is a block diagram of the present invention.

FIG. 2 shows a first embodiment of the present invention as implemented on DSP 16. Call manager 10 controls and processes commands through application program interface 12. In response to receipt of an incoming telephone call through telephone network interface 18, the call manager 10 detects a call then sends a signal to the application program interface 12 to issue an appropriate prompt message to play task 14. The play task 14 sends the prompt message to digital-to-analog converter 16 which generates outgoing prompt message signals to the user through the telephone network interface 18. The outgoing prompt message signals are also transmitted by the play task 14 to buffer controller 22. The buffer controller 22 stores the outgoing prompt message signals to a buffer 21.

Incoming signals are received through analog-to-digital converter 20 during the transmission of the outgoing prompt message by the play task 14. These incoming signals are digitized and sent to the buffer controller 22 which stores the digitized incoming signals to the buffer 21.

In the current embodiment of the present invention, the buffer controller 22 stores the incoming signals and the outgoing prompt message signals to a single, circular, interlaced buffer 21. If the incoming signals are represented as $i_1$, $i_2, i_3, \ldots, i_n$ and if the outgoing prompt message signals are represented as $o_1, o_2, o_3, \ldots, o_n$, the buffer controller 22 stores the signals in the interlaced buffer 21 as $i_1, o_1, i_2, o_2, \ldots, i_n, o_n$.

Storing the incoming signals and outgoing prompt message signals in an interlaced buffer 21 reduces storage space and retrieval time. With head and tail pointers to both sequences of data stored in the interlaced buffer 21, access to the incoming and outgoing signals is simpler and faster.

Using the incoming signals and the outgoing prompt message signals, a delay finder 27 determines the delay introduced into the outgoing prompt message signals and the incoming echo. This is done to reduce the computation required to cancel echos with long propagation delays. Then, a portion of the outgoing signals in the interlaced buffer 21 are transferred to the delay buffer 23 in accordance with the determined delay. In determining the delay, the delay finder 27 processes both the outgoing prompt message signals and the incoming signals are processed in twenty (20) millisecond subframes.

First, the delay finder 27 determines the energy level of a subframe of the outgoing prompt message signals stored in the interlaced buffer 21. If that energy level is above a certain threshold, a speech determination is made to determine where in the outgoing prompt message signals the prompt message starts. That outgoing prompt buffer offset is stored in memory. A subframe of the outgoing prompt message signals, determined in accordance with the outgoing prompt buffer offset, are then correlated with a subframe of the incoming signals.

If the outgoing prompt message is detected within the incoming signals as a result of the correlation, an incoming signal buffer offset is stored indicating the position of the outgoing prompt message within the incoming signals. The incoming signal buffer offset and the outgoing prompt buffer offset are then used to determine the delay.

Figure 3A:
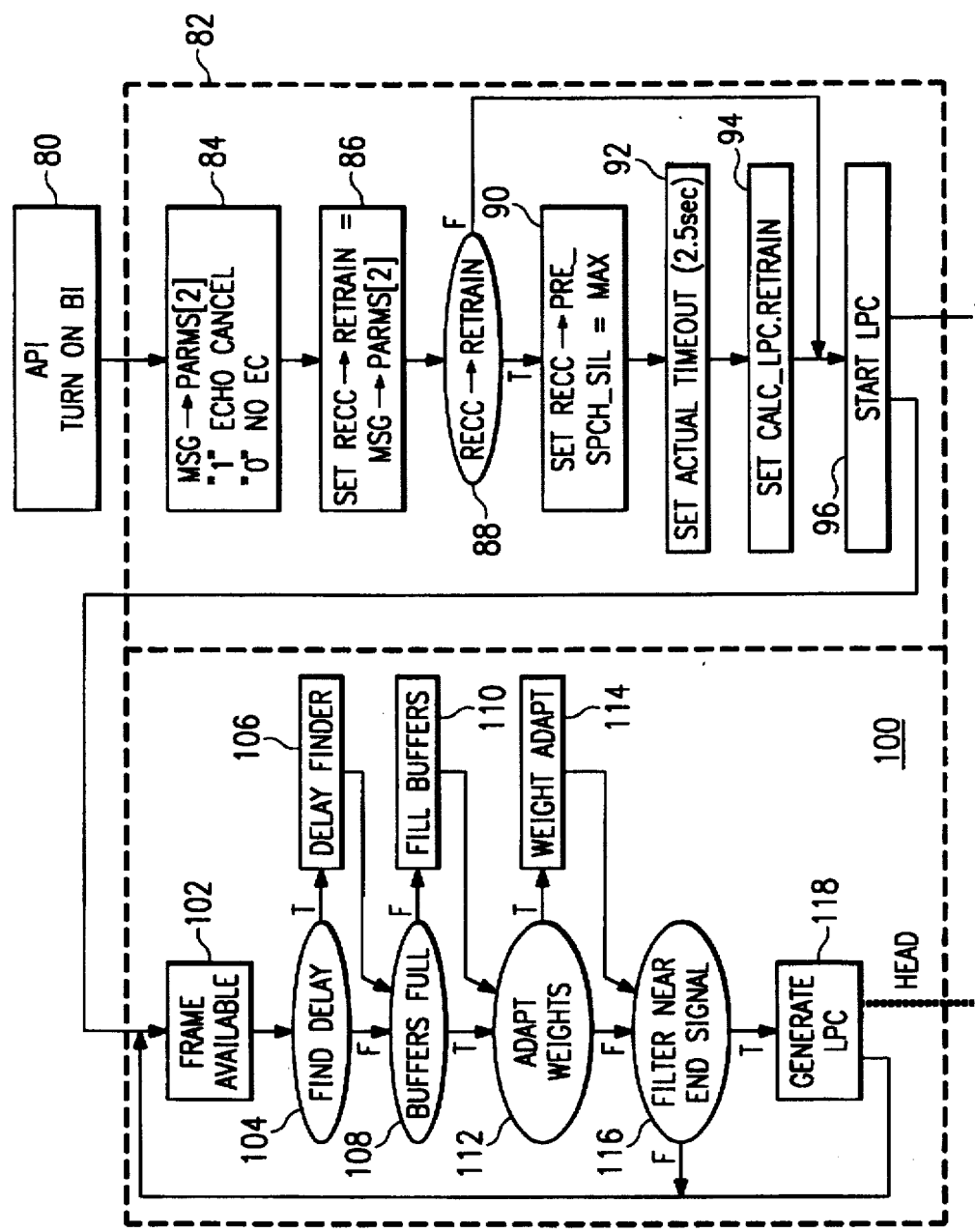
FIGS. 3A–3B shows a flow diagram illustrating the overall processing in one embodiment of the present invention.
Figure 3B:
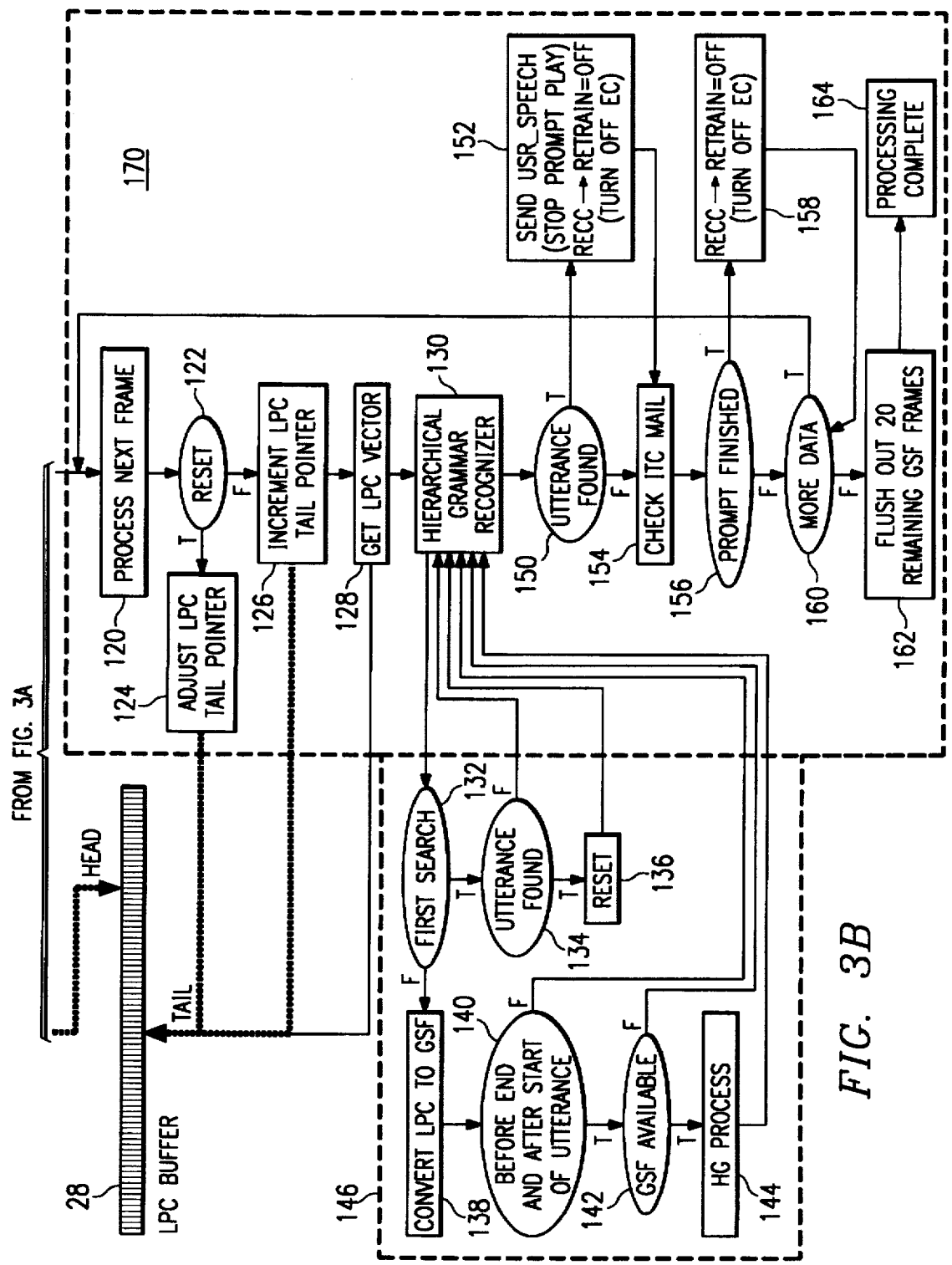

FIG. 3 illustrates in general the current embodiment of the present invention which includes an echo cancelling and delay finding process 100 which, in response to a process request module 82 stores LPC data representing the incoming signals in LPC buffer 28. The process request module 82 is controlled by application program interface 80. The vectors stored in the LPC buffer 28 are further processed using a speech task module 170 which, in the current embodiment of the present invention, processes the vectors stored in the LPC buffer 28 to determine where speech actually occurs within the stored signals. The beginning and ending frames of utterances within the stored signals is determined using the utterance finding module 146. If utterances are detected in the stored signals, the present invention stops the playing of the outgoing prompt message and turns echo cancellation off at block 152. Echo cancellation is also turned off at block 158 if the outgoing prompt message has finished.

Figure 4A:
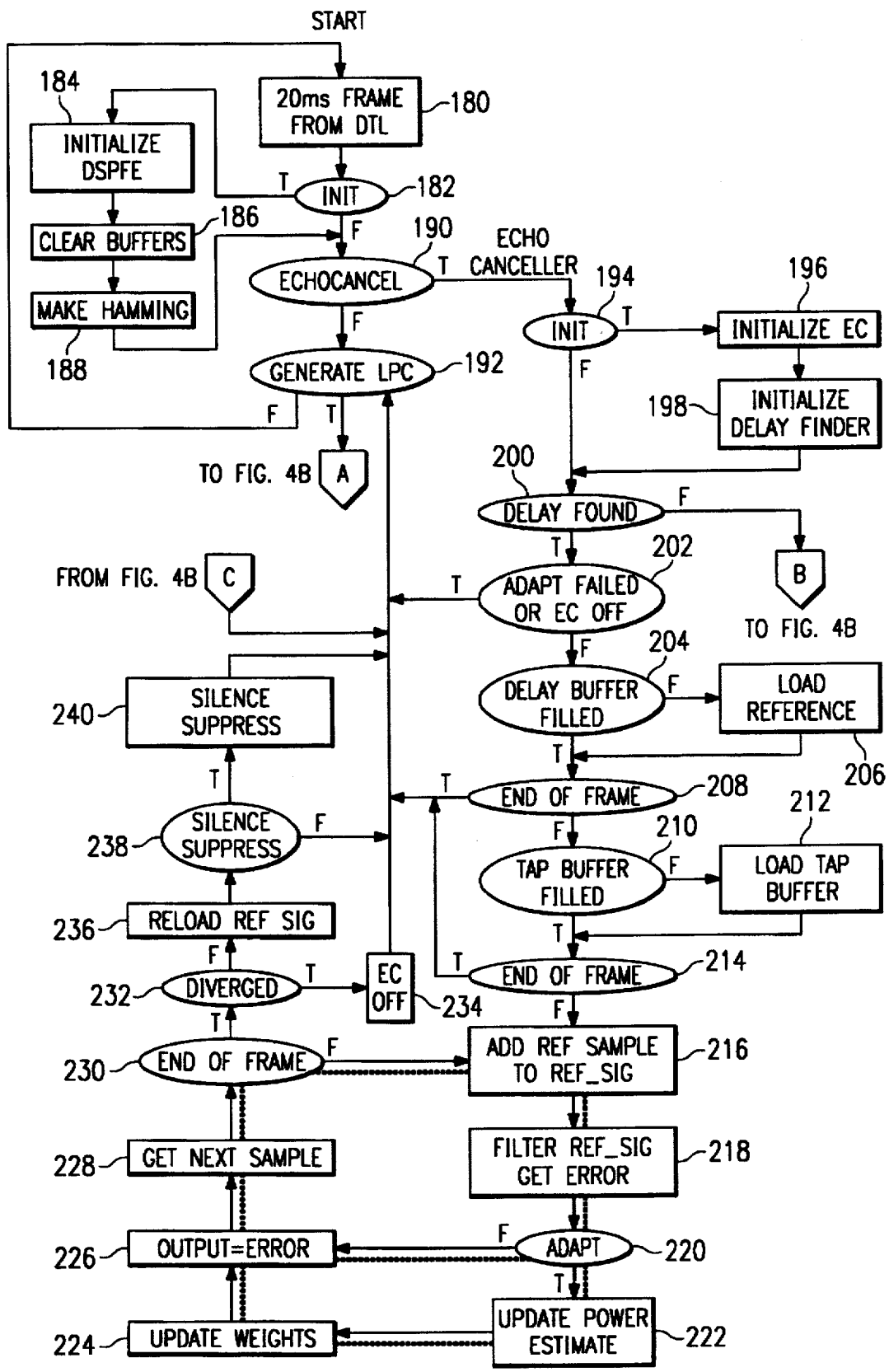
FIGS. 4A–4B is a flow diagram illustrating the delay finding, echo cancellation and linear predictive code generation processes used in the present invention.
Figure 4B:
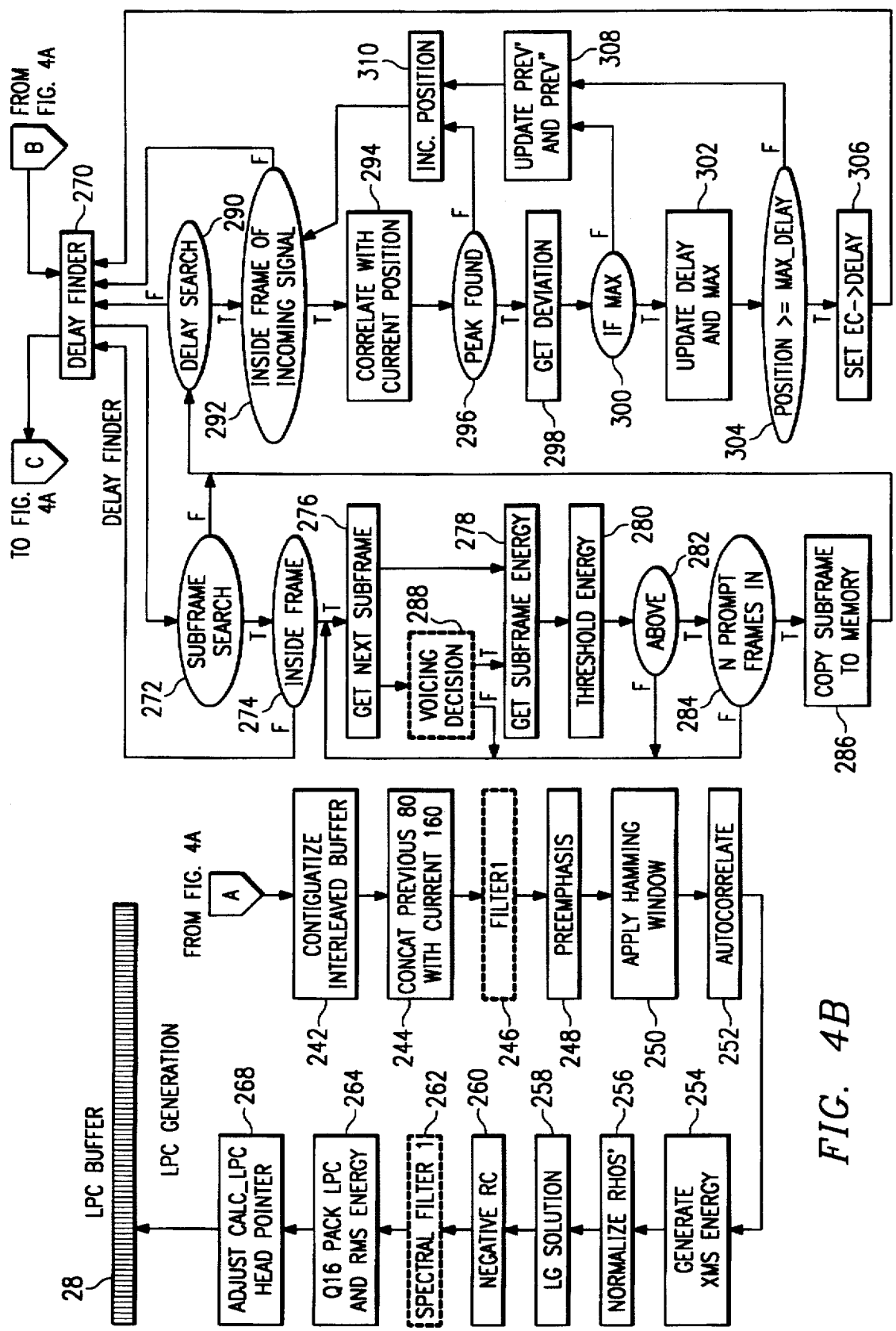

The echo cancelling and delay finding processes are shown in more detail in the flowchart shown in FIG. 4 starting at block 270. From block 270, a determination is made at decision block 272 whether to continue subframe searching of the outgoing prompt message signals. If subframe searching is not to continue, processing continues at decision block 290, discussed hereinbelow.

If subframe searching is to continue, another determination is made at decision block 274 as to whether processing is within a frame. If not within a frame, processing continues at block 270. If within a frame, processing continues at block 276 where the next subframe of outgoing prompt message signals is retrieved. From block 276, processing continues either at decision block 288, where a determination is made as to whether the current subframe of the outgoing prompt message signals includes voiced data, or at block 278 as a result of a previous determination that voiced data has been found in the outgoing prompt message signals.

If, at decision block 288, no voiced data is found in the current subframe of the outgoing prompt message signals, processing returns to block 276 and the next subframe of the outgoing prompt message signals is retrieved. If, at decision block 288, voiced data is found in the current subframe of the outgoing prompt message signals, processing continues at block 278 where the energy level of the subframe is determined.

From block 278, the energy level of the current subframe of the outgoing prompt message signals is compared to a predetermined threshold energy at block 280. If, at decision block 282, the energy level of the current subframe of the outgoing prompt message signals is above the predetermined threshold energy and if, at decision block 284, enough frames of the outgoing prompt message signals have been received, the current subframe is copied to memory at block 286 and processing continues at decision block 290. Otherwise, processing continues at block 276 where the next subframe of the outgoing prompt message signals is retrieved.

Once voiced data with an energy level above the predetermined threshold energy has been found in the outgoing prompt message signals, if, at decision block 290, the delay has already been determined and the delay finder 27 disabled, processing returns to block 270. If not inside a frame of the incoming signals, at decision block 292, processing again returns to block 270.

If, however, the delay finder 27 has not been disabled and if inside a frame of incoming signals, processing continues at block 294 where the current subframe of the outgoing prompt message signals is correlated with the incoming signals. If a peak is not found at decision block 296, processing continues at block 310 where the position within the incoming signals is incremented and then proceeds to decision block 292.

Otherwise, processing continues at block 298 where the standard deviation is determined. If, at decision block 300, the deviation has not maximized, processing continues at block 308 where accumulators are updated then to block 310. If, at decision block 300, the deviation is maximized, the delay is updated accordingly at block 302. If, at decision block 304, the position within the current frame of the incoming signal is less than a maximum delay, processing continues at block 308. Otherwise, the delay is determined at block 306 and processing continues at block 270.

From block 270, once the delay has been found, processing continues at decision block 192 where, if echo cancellation has been performed, linear predictive code (LPC) generation is initiated. Otherwise, processing continues at block 180 where the next 20 millisecond frame Of the incoming signals is retrieved.

From decision block 200, once the delay has been found, processing continues at decision block 202 where a determination is made as to whether the echo canceler 24 has been disabled or whether a previous attempt to adapt to the channel has failed. If either of these conditions are met, processing again returns at decision block 192 in preparation for LPC generation.

Otherwise, processing continues at decision block 204 where a determination as to whether the delay buffer 23 is filled is made. If the delay buffer 23 is not filled, processing continues at block 206 where reference signals are loaded into the delay buffer 23. Otherwise, the delay buffer 23 is filled with the signals in accordance with the delay determined in the delay finding process at block 270.

If, for example, the delay was determined to be 240 samples and the echo canceler handles 100 samples of data, i.e., the echo canceler has a 100 tap filter length, then the delay finder 27 stores data samples $i_{190}, i_{191}, \ldots i_{289}$ of the signal to the delay buffer 23 for further processing by the echo canceler 24. By determining the delay before invoking the echo canceler then echo cancelling a window of the signals in accordance with the length of the echo canceller's, the present invention thus provides effective barge-in capability independent of the structure of the communications network configuration.

The echo canceler 24 then processes the subframe, or window, of the signals stored in the delay buffer to remove the echo of the outgoing prompt message thus generating enhanced incoming signals. The enhanced incoming signals are stored in enhanced signal buffer 25.

The enhanced incoming signals are then processed by linear predictive code (LPC) generator 26 and the resulting linear predictive code vectors and associated energy levels are stored in LPC buffer 28 in preparation for processing by utterance extractor 30.

In the current embodiment of the present invention, the LPC generator 26 determines the associated energy levels of the enhanced incoming signals by determining the amplitudes of the resonances of the enhanced incoming signals. It is also contemplated that the LPC generator 26 may determine the associated energy levels of the enhanced incoming signals by determining the frequency spectrum of the enhanced incoming signals.

The speech recognition task, using the data stored in the LPC buffer 28, is controlled by speech recognition processor 36. The speech recognition processor 36 continuously monitors the LPC buffer 28 for speech and then processes that speech to determine the user response, if any, to the outgoing prompt message. By continuously monitoring of the LPC buffer 28 for data, the speech recognition processor 36 can perform speech processing for other applications or for other tasks until enough data is received in the LPC buffer 28.

First, the speech recognition processor 36 invokes utterance extractor 30 to determine where speech starts in the enhanced incoming signal data stored in the LPC buffer 28. In the current embodiment of the present invention, the utterance extractor 30 determines where speech starts in the LPC buffer 28 using energy based endpointing.

In energy based endpointing, again, the energy levels of the enhanced signals stored in the LPC buffer 28 are used to make a determination as to whether the enhanced signals represent speech. It is also contemplated that the utterance extractor 30 may determine where speech starts in the LPC buffer 28 using a model based method whereby the enhanced incoming signal data stored in the LPC buffer 28 is compared with known speech models.

If speech is found by the utterance extractor 30, a message is sent to the call manager 10 to discontinue transmission of the prompt message if the prompt message has not finished, i.e., the user has "barged in" during the transmission of the outgoing prompt message signals, and to turn off the echo canceler 24.

Generalized speech parameters (GSPs) and generalized speech features (GSFs) of the enhanced incoming signals stored in the LPC buffer 28 are determined by GSP/GSF generator 32 in accordance with the speech start location determined by the utterance extractor 30. The GSPs and GSFs are stored in GSP/GSF buffer 34.

Speech recognition processor 36 then compares the GSFs with grammars or speech models downloaded from the call manager 10 through the application program interface (API) 12. The results of the comparison are then uploaded to the API 12 for further processing.

In the current embodiment of the present invention, the speech recognition processor 36 uses a Hidden Markov method to compare the GSFs with the grammars or speech models downloaded from the API 12. However, it is contemplated that other speech recognition methods may be used.

Although the present invention has been described in detail, it should be understood that various changes, substitutions and alterations can be made thereto without departing from the spirit and scope of the present invention as defined by the appended claims.

What is claimed is:

1. A system for providing voice-activated prompt interrupt across a communications channel using an echo canceler, the echo canceler including an adaptive filter having a predetermined tap filter length, comprising:

a call manager, coupled to said communications channel, for detecting incoming calls from said communications channel;

an application interface, coupled to said call manager and responsive to said incoming calls, for generating an outgoing prompt message;

a play task, coupled to said application interface and to said communications channel, for transmitting outgoing signals representing said outgoing prompt message through the communications channel;

a first buffer;

a buffer controller, coupled to said communications channel, to said first buffer and to said play task, for receiving said outgoing signals from said play task and storing said outgoing signals to said first buffer and for receiving incoming signals from said communications channel during said transmitting of said outgoing signals and storing said incoming signals to a second buffer, said incoming signals including an echo of said outgoing prompt message;

a delay finder, coupled to said second buffer, for determining a first buffer offset signal in response to determining whether energy of said outgoing signals exceeds a first predetermined threshold;

said delay finder further operable to determine a second buffer offset signal in response to correlating said outgoing signals in said first buffer with said incoming signals in said second buffer in accordance with said first buffer offset signal;

said delay finder further operable to determine a channel delay in response to said first buffer offset and said second buffer offset;

a third buffer;

an echo canceler, coupled to said second buffer and to said third buffer, for removing said echo from a portion of said incoming signals to provide enhanced incoming signals and for storing said enhanced incoming signals to said third buffer, said portion of said incoming signals determined by said delay finder in accordance with said channel delay and said predetermined tap filter length.

2. The system of claim 1 further including:

a fourth buffer;

a linear predictive code generator, coupled to said echo canceler and to said fourth buffer, for generating linear predictive code vectors and determining associated energy levels in response to said enhanced incoming signals and for storing said linear predictive code vectors and said associated energy levels to said fourth buffer;

an utterance extractor, coupled to said fourth buffer, for making a determination, in response to said associated energy levels, whether spoken words are included in said enhanced incoming signals and for initiating termination of said transmission of said outgoing prompt message and disabling said echo canceler in response to said determination;

a fifth buffer;

a speech generator coupled to said fourth buffer and to said fifth buffer and responsive to said determination made by said utterance extractor for generating speech parameters and speech features from said linear predictive code vectors and for storing said speech parameters and said speech features to said fifth buffer; and a speech recognition processor coupled to said utterance extractor, to said speech generator and to said fifth buffer for processing said speech parameters and said speech features to determine a response to said outgoing prompt message and for transmitting said response to said application program interface.

3. The system of claim 2 wherein said speech recognition processor compares said speech parameters and said speech features to grammars downloaded from said call manager through said application program interface to determine said response to said outgoing prompt message.

4. The system of claim 2 wherein said speech recognition processor compares said speech parameters and said speech features to speech models downloaded from said call manager through said application program interface to determine said response to said outgoing prompt message.

5. The system of claim 2 wherein said linear predictive code generator determines said associated energy levels by determining the amplitudes of the resonances of said enhanced incoming signals.

6. The system of claim 2 wherein said linear predictive code generator determines said associated energy levels by determining the frequency spectrum of said enhanced incoming signals.

* * * * *